United States Patent [19]

Green et al.

[11] Patent Number: 4,860,484
[45] Date of Patent: Aug. 29, 1989

[54] REEL SEAT STRUCTURES FOR FISHING RODS

[76] Inventors: Milton J. Green, Rte 2, Box 73417, Quilence, Wash. 98376; Timothy D. Grennan, 5901 Croupier Dr., Huntington Beach, Calif. 92647

[21] Appl. No.: 121,044

[22] Filed: Nov. 16, 1987

Related U.S. Application Data

[63] Continuation-in-part of Ser. No. 884,902, Jul. 14, 1986, abandoned.

[51] Int. Cl.⁴ ............................................. A01K 87/06
[52] U.S. Cl. ......................................... 43/22; 43/18.5
[58] Field of Search .................... 43/22, 23, 18.1, 18.5

[56] References Cited

U.S. PATENT DOCUMENTS

| | | |
|---|---|---|
| 878,757 | 2/1908 | Wheeler. |
| 2,057,535 | 10/1936 | McKechnie ........................... 43/22 |
| 2,069,977 | 2/1937 | Spencer ................................ 43/22 |
| 2,424,430 | 7/1947 | Beyer .................................... 43/22 |
| 2,593,747 | 4/1952 | Godfrey ................................ 43/22 |
| 2,667,713 | 2/1954 | Stephens .............................. 43/22 |
| 2,702,192 | 2/1955 | Warth ................................. 279/49 |
| 2,782,547 | 2/1957 | McMullin .............................. 43/22 |
| 2,967,370 | 1/1961 | Bush ..................................... 43/22 |
| 3,047,974 | 8/1962 | Stephens .............................. 43/22 |
| 3,123,931 | 3/1964 | Stephens .............................. 43/22 |
| 3,175,321 | 3/1965 | Stephens .............................. 43/22 |
| 3,196,572 | 7/1965 | Steinle ................................. 43/22 |
| 4,355,480 | 10/1982 | Morishita ............................. 43/22 |
| 4,516,351 | 5/1985 | Highby ................................. 43/23 |
| 4,601,127 | 7/1986 | Maeda ............................... 43/18.5 |
| 4,644,680 | 2/1987 | Dawson ............................. 43/18.1 |
| 4,649,661 | 3/1987 | Myojo ............................... 43/18.1 |
| 4,703,578 | 11/1987 | Highby ............................. 43/18.1 |

*Primary Examiner*—Gene P. Crosby
*Attorney, Agent, or Firm*—Fleit, Jacobson, Cohn, Price, Holman & Stern

[57] ABSTRACT

Reel seat structures for fishing rods are herein disclosed in two separate embodiments. In a first embodiment a fishing rod body is provided with a tubular insert on which the reel seat is formed and which is located in an elongate aperture in the rod body. The tubular insert is formed with a long keyhole-shaped opening in which a movable reel retaining hood slides under the control of a rotary knob located in a further opening in the insert body adjacent the keyhole-shaped opening. One end of the aperture in the rod body forms a stationary reel-retaining hood. In a second embodiment, the movable hood slides in a keyhole-shaped opening formed directly in the rod body and there is a separate stationary hood which fits in another opening in the rod body and which is wedged in place by a tubular insert body with a slot that embraces a neck portion of the stationary hood internally of the rod.

10 Claims, 4 Drawing Sheets

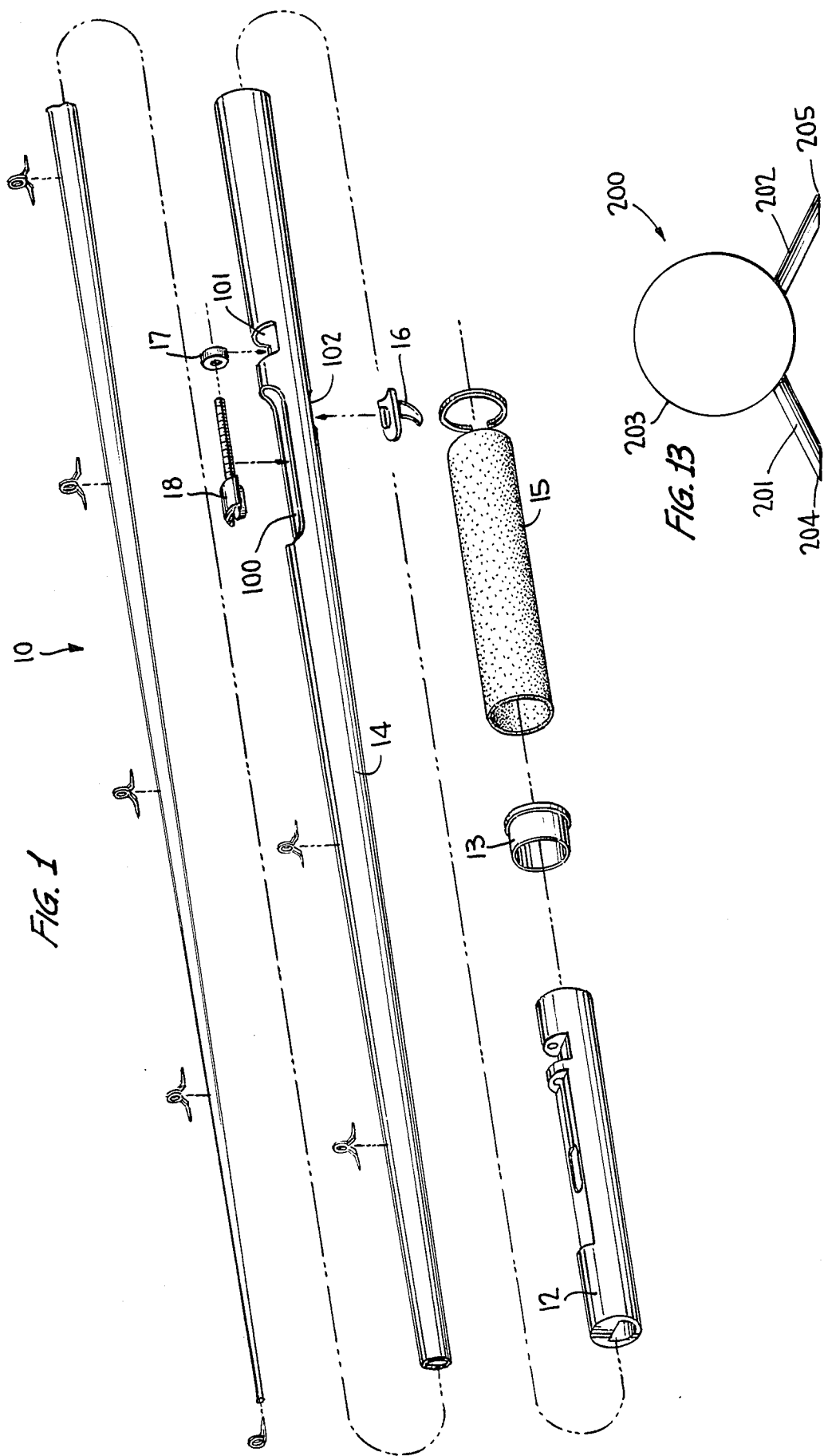

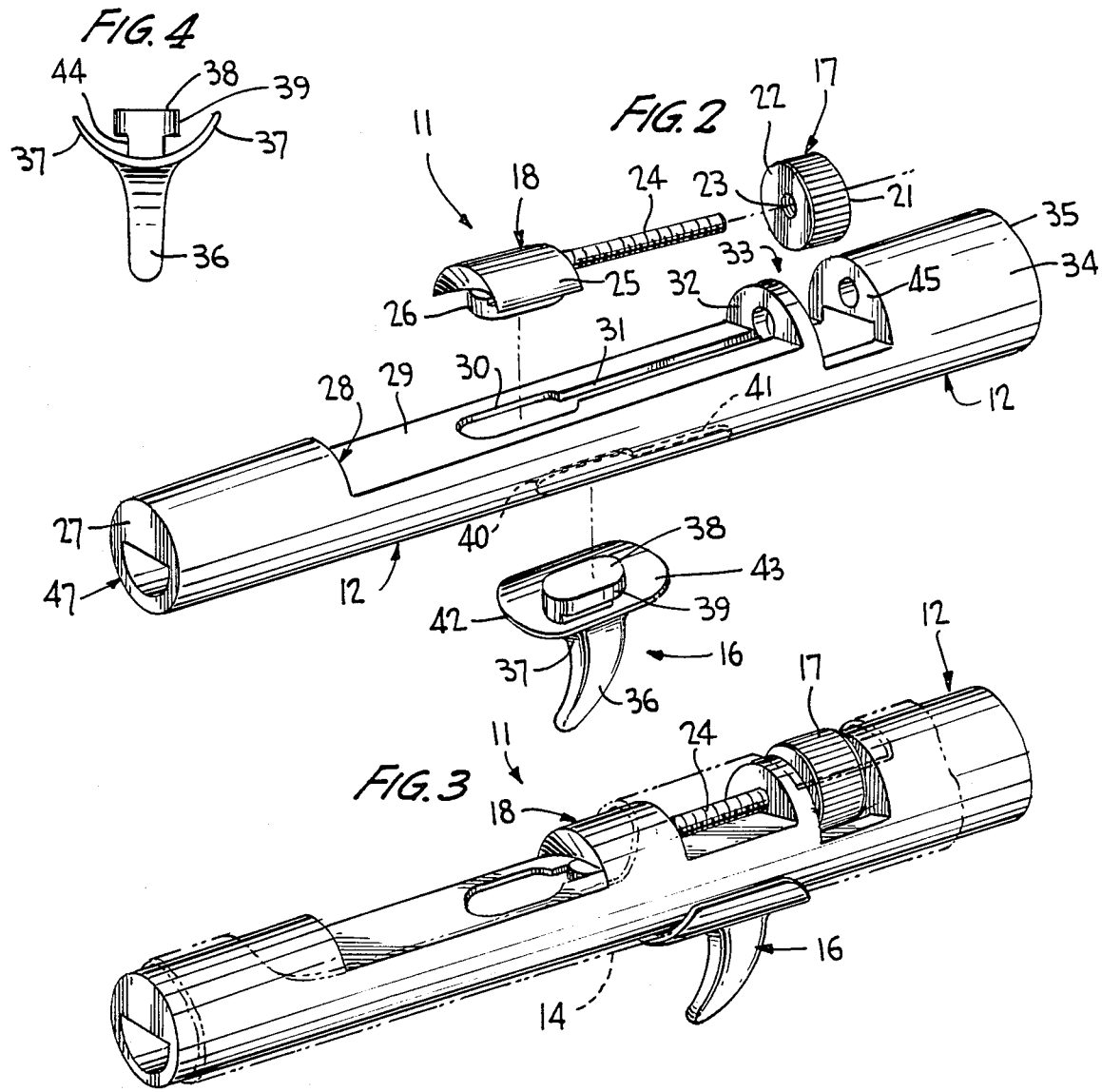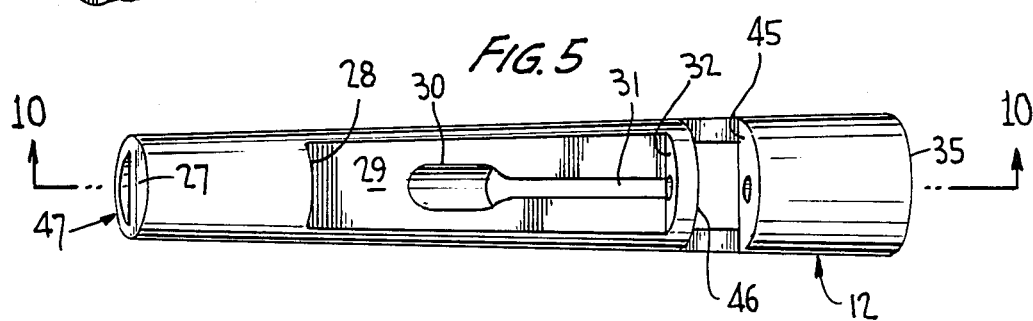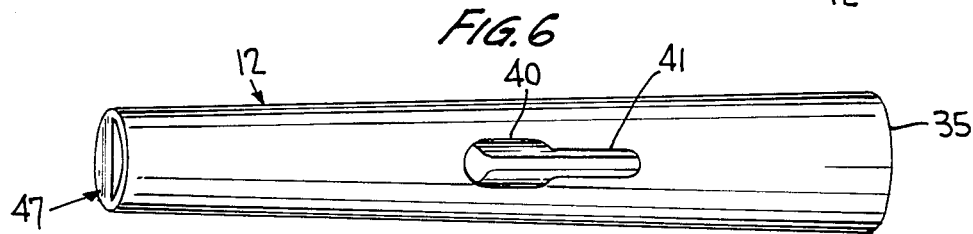

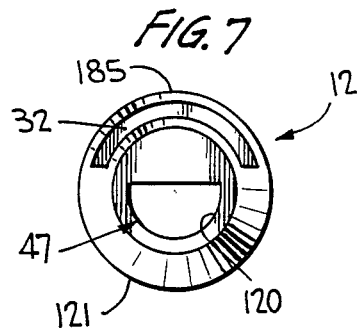
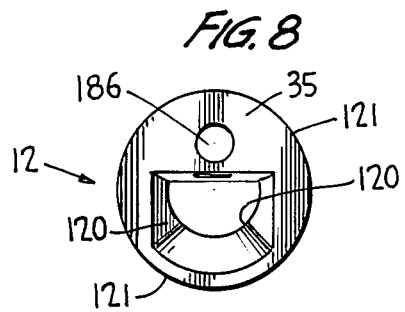
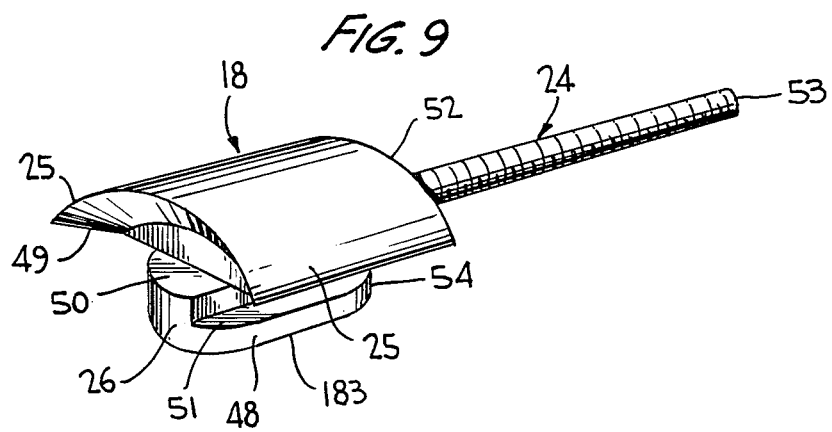
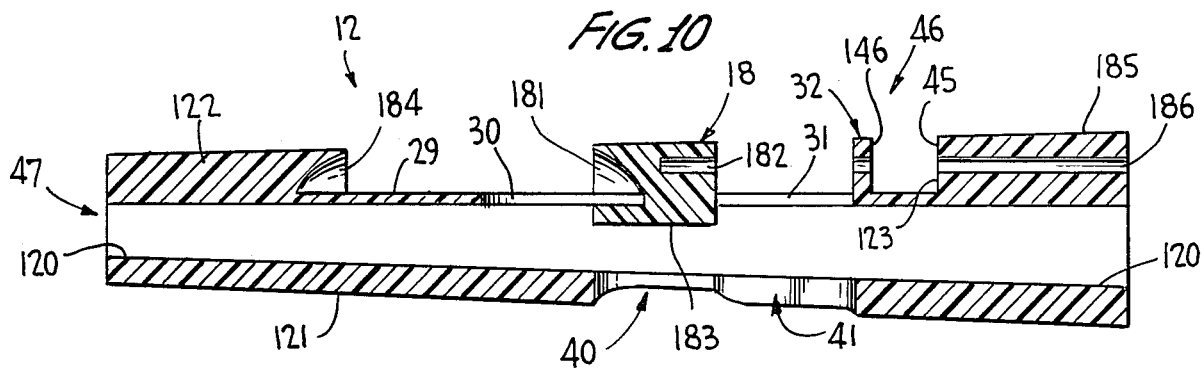
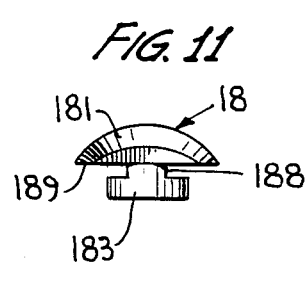
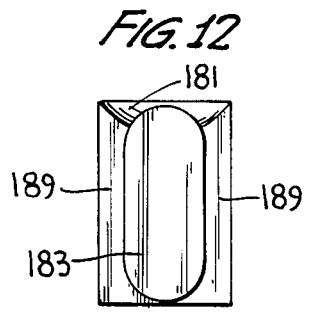

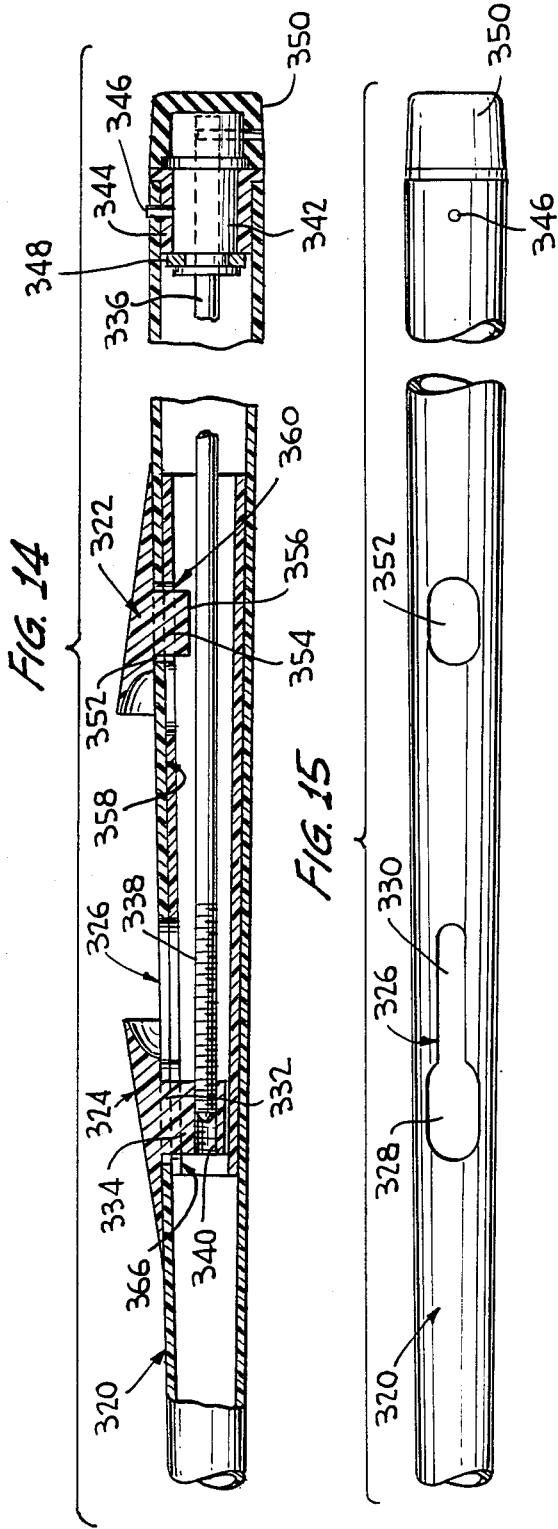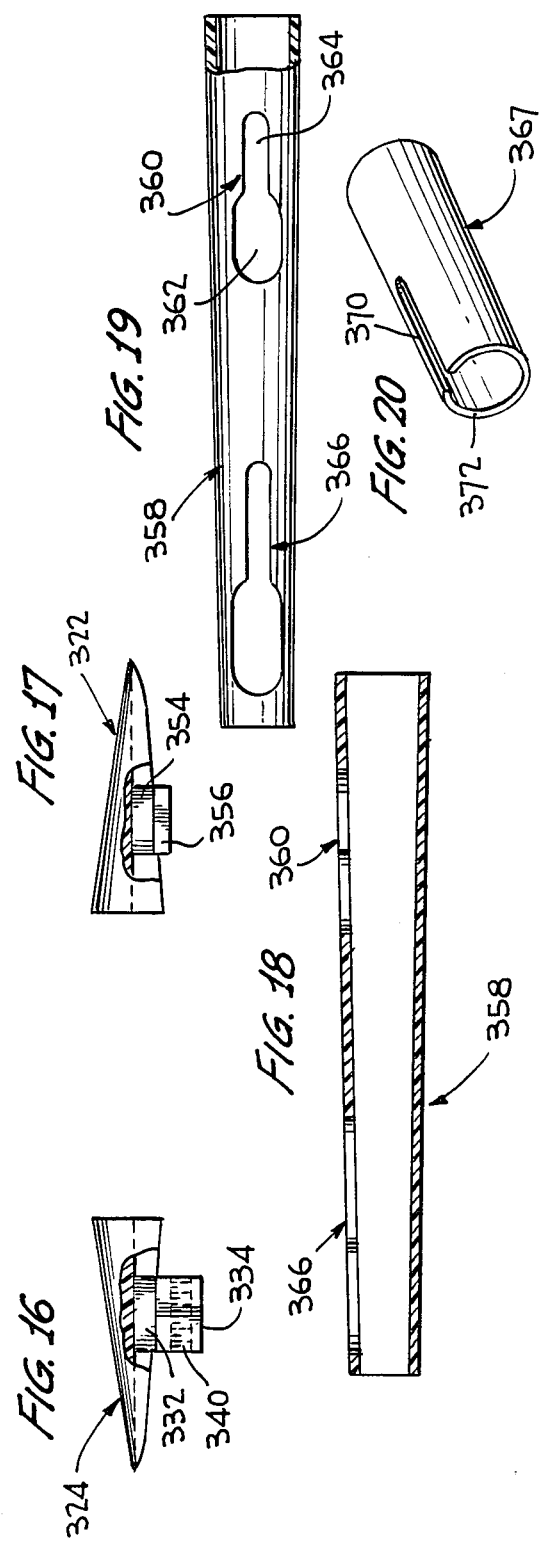

4,860,484

REEL SEAT STRUCTURES FOR FISHING RODS

CROSS-REFERENCE TO RELATED APPLICATION

This application is a continuation-in-part of Application Ser. No. 884,902 filed July 14, 1986, now abandoned, and the contents of which is expressly incorporated herein by reference.

BACKGROUND OF THE INVENTION

1. Technical Field:

The present invention relates to seats for reels, and in particular to improved reel seat constructions for use with fishing rods.

2. The Prior Art:

Prior art fishing rods and fishing reels are known generally. Such rods usually are of a multi-piece construction having a plurality of glue joints. Such conventional devices include a mounting means for the reel which is affixed to the outside of a fishing rod.

There are problems in the conventional construction described above. The multi-piece construction causes "dead spots" in the transmission of strike signals (vibration) through the rod to the handle, and thereby to the hand of a fisherman. Furthermore, such multi-piece construction also requires use of thicker material and in greater amount due to the inherent weakness of joints in such multi-piece construction.

It is therefore a problem to provide a fishing rod for supporting a reel which is relatively light and which ensures a smooth transmission of vibrations and sound from the tip of the rod to the handle without sacrificing rod strength or rod flexibility. It is also a problem to provide a secure seat for a reel to permit detachable attachment of the reel to the rod.

SUMMARY OF THE INVENTION

It is therefore an object of the present invention to provide a seat for the reel for use with fishing rods, which can be inserted into a hollow handle of a fishing rod.

It is another object of the present invention to provide a fishing rod with a reel seat which eliminates multi-piece construction of the fishing rod itself while reducing the weight of the fishing rod.

The present invention includes an insertable reel seat which is preferably used with a one-piece rod construction. Such rod construction is, for example, that shown in U.S. Pat. No. 4,468,270 entitled "Method and Apparatus for Fabricating Fishing Rods", the entire disclosure of which is hereby incorporated by reference. Mandrels in this reference are used for supporting heat-curable sheet material which is wrapped around the mandrel. These permit formation of fishing rods which can be used with the present invention. However, any other fishing rod construction can be used with the present invention so long as there is a hollow handle portion for receiving an insert seat.

Preferably, the fishing rod used has a continuous taper without glued-together sections so as to ensure a smooth flow of vibration from a taper portion to a handle portion, so that strike signals of fish attacking a line can be detected by a fisherman holding the handle of the rod. This construction preferably eliminates all glued and other joints that tend to create "dead spots" which hinder signal transfer i.e., which hinder transmission of vibrations along the rod length. Preferably also, an enlarged butt portion is formed for serving as the handle, the butt portion having openings therein for accepting an internally mounted reel seat insert.

The rod also preferably includes a rapidly increasing taper portion and large diameter at the handle portion of the butt to, in effect, extend the length of the casting handle where casting rods are used. This allows better tip control and thus better casting accuracy without requiring additional rod length.

The fishing rod used with the present invention preferably has a large gradient taper connecting the rod end to the handle portion so as to substantially eliminate any soft middle rod portion which would be otherwise conventionally used, such soft middle sections of the prior art having a tendency to absorb vibrations in an undesirable manner. The present invention avoids this defect.

The reel seat according to one embodiment of the present invention is wedged into a handle blank, and is then maintained in position by glue. The handle end is then plugged. An opening formed in the handle blank permits insertion of a reel tightening means which includes a thumb wheel and a slide member (the slide member being referred to as a "skip"). The slide member cooperates with the handle to permit retention of a reel tightly by actuation of the thumb wheel and slide. The thumb wheel and slide can be inserted into the opening in the handle after the reel seat insert has been inserted into the handle. This is done by manipulating the slide and the thumb wheel into position through the opening in the handle, so as to permit the thumb wheel to be exposed to the hand of the fisherman.

Where a "trigger" is desired such as for use with casting rods, another opening can be formed in the handle to permit addition of a trigger member which can be also anchored in the rod by the reel seat insert member.

In another embodiment of the invention a movable reel-retaining hood and a fixed hood are mounted directly to the rod body. The movable hook fits in a keyhole-shaped aperture in the rod body and is connected internally of the rod body to an adjustment mechanism with a control knob at the end of the rod. The fixed hood projects through an aperture in the rod body and is wedged in place internally of the rod body by a tubular insert with a slot which embraces a neck portion of the fixed hood and traps an enlarged head of the fixed hood within the rod body.

BRIEF DESCRIPTION OF THE DRAWINGS

FIG. 1 is an exploded perspective view of the parts of a fishing rod according to a first embodiment of the invention;

FIG. 2 is an enlarged exploded perspective view of an insert member and associated elements used in the first embodiment;

FIG. 3 is a perspective view showing the elements of FIG. 2 in assembled condition;

FIG. 4 is a front elevational view of a trigger member used in the first embodiment;

FIG. 5 is a top elevational view as seen from a point slightly to the left of top center, of the insert member body without attachments;

FIG. 6 is a bottom elevational view taken slightly from the left of top center, of the insert member body of FIG. 5;

FIG. 7 is a left-hand elevational view of the insert member body of FIG. 5;

FIG. 8 is a right-hand elevational view of the insert member body of FIG. 5;

FIG. 9 is a perspective view of a skip used with the insert body in the first embodiment;

FIG. 10 is a side sectional view taken along line 10—10 of FIG. 5;

FIG. 11 is an end elevational view of the skip;

FIG. 12 is a bottom-elevational view of skip shown in FIG. 11;

FIG. 13 is a side schematic elevational view of a spinning and casting fishing reel useable with the first embodiment fishing rod;

FIG. 14 is a sectional elevational view of the handle end of a second embodiment fishing rod according to the invention;

FIG. 15 is a plan view of the handle end of the rod shown in FIG. 14, with parts removed;

FIG. 16 is an elevational view of a movable reel seat element used in the second embodiment;

FIG. 17 is an elevational view of a fixed reel seat element used in the second embodiment;

FIG. 18 is a sectional elevation view of an insert body used in the second embodiment;

FIG. 19 is a plan view of the insert body; and

FIG. 20 is a perspective view of a modified insert body.

DETAILED DESCRIPTION OF THE INVENTION

A fishing rod assembly 10 according to a first embodiment of the present invention is shown in FIG. 1 in perspective view with the parts shown in exploded form. An insert member body 12 is shown as being insertable into a hollow handle portion of a fishing rod body 14. Preferably, force is applied to the body 12 so that a relatively large frictional force arises between the body 14 and the body 12. A plug 13 is also insertable into the fishing rod body 14 after insertion of the insert member body 12 to enclose the body 12 within the fishing rod body 14. Glue is preferably applied to the body 12 prior to insertion within the body 14, so that the body 12 is fixedly attached thereto upon setting of the glue. Before closure of the fishing rod body 14 with the plug 13, a handle 15 is passed over the fishing rod body, to serve as a grip. The handle 15 can be glued to the fishing rod body, as is conventional, or may be otherwise attached.

FIG. 1 shows a skip 18, defining a movable reel seat or hood element which is slid into place in the insert member body 12 and retained by an internally threaded thumb wheel 17. A trigger member 16 extends through an aperture 102 disposed on the lower side of the fishing rod body 14 and is secured in place by the insert body 12. The skip 18 is inserted through an opening 100 formed in the fishing rod body 14, and the thumb wheel 17 is inserted into another opening 101 in the fishing rod body 14 on the same side of the fishing rod body 14 as the opening 100 for the skip member 18.

The insert member body 12 is adapted to serve as a reel seat. A reel (not shown in FIG. 1; shown in FIG. 13) is affixed to the insert member body 12 through the opening 100 in the fishing reel body 14. Thus, after assembly of the insert body 12 into the fishing rod body 14, the fishing reel can be inserted slightly into the opening 100 and then affixed to the insert member body 12 by screw adjustment of skip 18. Thus, without compromising the integrity of the fishing rod body 14, a fishing reel can be strongly affixed to the insert member body 12 so as to provide a strong, stable platform for support of the fishing reel.

Fishing reels themselves are well-known, and the manner of assembly of a fishing reel to a fishing rod portion having an upper surface adapted to support a fishing reel is also well-known in the prior art.

There are generally considered to be two types of fishing rod and reel assemblies, those for casting and those for spinning. The casting models according to the present invention preferably have the trigger member 16 for use with casting. The trigger member 16 is received within the opening 102 of the rod body 14 and secured in place by the insert body as will be described. The spinning models, on the other hand, do not use a trigger 16, and therefore the trigger 16 would be omitted as would be the opening 102 in the fishing rod body 14. A plurality of loops (unnumbered) for serving as a fishing line guide are shown as being attachable to the fishing rod body 14, as indicated by the dotted lines in FIG. 1. Such loops as is well known serve to guide the fishing line to the tip of the pole, and as is conventional are attachable by tape or the like to the fishing rod body 14.

The fishing rod body 14 according to the present invention is preferably a one-piece hollow construction fishing rod body composed of graphite fibers in a plastic matrix material, such as is known in the prior art. However, the insert member body 12, and the parts assemblable therewith, can be used with any fishing rod body, including wooden bodies, metal bodies, molded plastic bodies, ceramic bodies, and other fishing rod bodies whether of one-piece or multiple-piece construction, so long as such fishing rod bodies contain a means for receiving or mounting the insert member 12 securely thereto.

FIG. 2 shows the assembly of the parts of the insert member into the insert member body 12. The skip 18 has a threaded projection 24, projecting from one end thereof, and has an enlarged bottom portion 26 adapted to fit within an enlarged opening portion 30 of the body 12. A narrower neck portion connects the upper portion 25 of the skip to the lower portion 26, such narrower portion being indicated as portion 188 (as seen in FIG. 11). The narrower portion 188 is adapted to fit within the slot 31, so that the large portion 26 retains the skip 18 against the body 12.

As seen in FIG. 2, the slot 30 is formed within a generally flat wall 29. An upstanding wall 32 is disposed at the end of the slot 31, and has an opening therein (bore 146 in FIG. 10). An opening 33 is formed in the body 12 between the wall 32 and an upstanding wall portion 45. The upstanding wall portion 45 also has an opening therein (bore 186 in FIG. 10). The opening 33 is adapted to receive the thumb wheel 17 therein, with the openings 146, 186 in the respective walls 32 and 45 being generally aligned with a threaded opening 23 in the thumb wheel 17. The thumb wheel 17 has a corrugated outer surface 21 and side walls 22.

The insert member body 12 has a smaller end 27 and a larger end 35. An opening 47 is formed in the small end 27, so as to permit less material to be used in the body 12 which is hollow. The hollow portion 47 of the body 12 also permits room for insertion of the enlarged portion 26 of the skip 18, as well as an enlarged portion 38, 39 of a trigger 16. The trigger 16 has a curved, "sculptured", portion 37 and a finger grip (or a "trigger" portion) 36, the sculptured portion having an uppermost surface 38 and a front end 42.

The body 12 has a lower opening 40 of enlarged size as compared to a slot portion 41. These are shown in dotted outline in FIG. 2. The enlarged portion 38, 39 of the trigger 16 when inserted through opening 102 of body 14, is initially received within the large opening 40, and insert body 12 can then slide so that a narrow portion (unnumbered in FIG. 2; shown in FIG. 4 by numbered portion 44) of the trigger is received snugly within the slot 41. This "dovetail" fit permits the trigger 16 to be securely retained to the body 14.

The body 12 has a wall 28 disposed nearer the end 27, the wall 28 having an undercut or stationary seat portion (not shown in FIG. 2; shown in FIG. 10) for receiving one projecting arm of the reel, the other projecting arm of a reel being received within a hollow of skip 18 (unnumbered in FIG. 2, indicated as hollow region 181 in FIG. 10), such that adjustment of the skip 18 along the slot 31 results in retention of the reel 200 as explained hereunder.

FIG. 3 shows the parts of FIG. 2 in their assembled condition. In this figure, the threaded projection 24 is received within the openings of the walls 32 and 45 and is also received within the opening 23 of the thumb wheel 17. The threaded opening 23 and the projection 24 threadingly mate and permit adjustment of the position of the skip 18 along the length of the slot 31 to be controlled by rotation of the thumb wheel 17. Thus, the reel 200 can be supported and detachably attached to the body 12 between the wall 28 and the skip 18 by manipulation of the thumb wheel 17 so that large compressive forces are generated between the skip 18 and the wall 28. This retains the reel 200 securely to the body 12. Also as seen in FIG. 3, the trigger 16 is shown in assembled condition relative to the body 12 and body 14.

FIG. 4 is a front elevational view of the trigger member 16, showing the front end 43, and the neck portion 44. The curved portion 37 is shaped to be snugly received and retained against the generally cylindrical outer portion of the body 14.

FIG. 5 is a top elevational view as seen slightly fro the left, of the insert body 12. Here, the opening 30 and the slot 31 are seen in generally true view.

FIG. 6 is a bottom elevational view taken slightly to the left of the insert body, showing the enlarged opening 40 and slot 41 generally in true view.

FIG. 7 is a left hand end elevational view of the body 12, showing the end 27 and opening 47 therein. As seen from FIG. 7, the body 12 tapers in a outwardly direction toward the distal end as seen from FIG. 7. The furthermost top portion of the body 12 is indicated as portion 185, and the insert body lower wall is indicated as portion 121 in FIG. 7.

FIG. 8 is an end elevational view as seen from the right of FIG. 5, showing the end 35 of the body 12. End 35 has an opening 186 therein for receiving the threaded projection 24 of the skip 18. As seen in FIG. 8, the body 12 has a tapered opening wall 120, which ends at its distal end which terminates at portion 47 (shown in FIG. 7).

FIG. 9 is a perspective view, which is enlarged for clarity, of the skip 18. Here, the skip 18 has an upper portion 25, the upper portion 25 having an underside 49. The skip has an upper front wall 52, and the threaded portion 24 terminates in an end 53.

The skip 18 has a front lower enlarged portion 54, the enlarged portion having side walls 48, the side walls 48 having an upper surface 51. The skip has a lower rear portion 26 having an upper surface 50 thereon. The skip 18 also has a lower surface 183.

FIG. 10 is a sectional view taken along line 10—10 of FIG. 5, generally showing the skip 18 disposed within the slot 31 and showing the general construction of the body 12. The dimensions of this figure are exaggerated somewhat for clarity.

The body 12 has an upper portion 122 adjacent the left-most portion as seen in FIG. 10, and having an undercut portion 184 adapted to receive a projecting arm of the reel. The recess 181 in the skip 18 is also visible in FIG. 10. The skip 18 has a bore 182 therein for receiving the member 24, the member 24 preferably being a metal screw-threaded body. This member 24 is molded, glued, or threaded and glued, into the bore 182 so that it is fixedly attached thereto. As seen in FIG. 10, the wall 32 has an opening 142 therein, and the wall 45 has a bore 186 therethrough. The wall 45 has an upper portion 185 and a lower portion 123.

The body 12 has a lower wall 121, slot 41, and opening 40 therein. A lower wall 183 of the skip 18 is seen in FIG. 10.

FIG. 11 is a left hand end elevational view of the skip 18 showing the recess 181 having a lower surface 189, neck 188, and lower enlarged body 183.

FIG. 12 is a bottom elevational view of the skip 18 of FIG. 11. The skip 18 is preferably formed of a moldable material such as plastic, for convenience of manufacture, although it can be formed of any other material and by any other process known, such as die casting of metal, cold working of metal, or the like.

FIG. 13 schematically shows a spinning and casting fishing reel 200 having a reel body 203. The reel 200 has support arms 201 and 202, which have respective ends 204 and 205. The reel is of the type rotatably supporting a spindle (not shown) for winding fishing line. The tips 204 and 205 are adapted to fit into the recesses 184 and 181 so as to be retained to the insert body 12.

FIGS. 14–19 show a second embodiment fishing rod sructure wherein a one-piece tapered rod body or blank 320 of similar construction to rod body 14 of the first embodiment, is itself used to form a reel seat, and which includes a fixed reel seat or hood member 322 and a movable reel seat or hood member 324 to secure opposed legs of a reel therebetween.

The rod blank is formed with a keyhole-shaped aperture 326 having a head portion 328 and a narrow elongate slot portion 330. The movable hood member 324 has a depending flange 332 and enlarged head 334. Head 334 can fit through head portion 328 of aperture 326 but not through slot portion 330. However, flange 332 can slide in slot portion 330 as a guide.

To move the movable hood member 324 along slot portion 330, there is provided an elongate rod 336 within the hollow interior of body 320. Rod 336 has a threaded inner end 338 which engages a threaded bore 340 in the head 334 of the movable hood member. The outer end of rod 336 is fixed to a knob 342 journalled in a bearing 344 of plastic or the like. The bearing is fixed in the end of blank 320 by a pin 346. Knob 342 may be held in the bearing by a collar assembly 348 and the knob may have a cover 350 of rubber or like resilient material. It is evident that rotation of the knob causes the movable hood member 324 to move lengthwise along slot portion 330 thereby adjusting its position, so that by moving the member 324 toward the fixed hood member 322 a reel can be trapped between the respective hood members with the outer surface of body 320 providing a reel seat.

The fixed hood member 332 is secured to blank 320 in similar manner to the securement of trigger 16 to body 14 in the first embodiment. Thus, blank 320 is formed with a further aperture 352 adjacent to and longitudinally aligned with aperture 326. Fixed hood member 322 is formed with a thin depending neck 354 and enlarged head 356, which fit through aperture 352. To wedge the fixed hood member in place in aperture 352 there is provided a hollow insert body or sleeve 358, similar to insert body 12 of the first embodiment. Sleeve 358 has a first keyhold aperture 360 with an enlarged portion 362 and narrower elongate slot portion 364 which is too narrow for head 356 to fit through, but which can receive neck 354. Initially, during assembly, enlarged portion 362 is aligned with aperture 352 so that head 356 can fit through blank 350 and sleeve 358. Then sleeve 358 is pushed to the left causing slot portion 364 to embrace neck 354 and prevent head 356 from being withdrawn. The sleeve may be glued in position as in the previous embodiment.

Sleeve 358 is extended to reinforce blank 320 in the region of the movable hood member 324 and has a further keyhole-shaped aperture 366 which, when the structure is assembled, aligns with aperture 326 in blank 320. The movable hood is effectively mounted in the aligned apertures. As a modification, however, if the insert sleeve is required only for wedging the fixed hood member, or a like projecting element in place, a modified sleeve 367 as shown in FIG. 20 may be used. Sleeve 367 is substantially shorter than sleeve 358 and has a slot 370, conforming to slot portion 364, extending from one end 372. In use, the head 356 of the fixed hood member is inserted through aperture 352 immediately adjacent end 372 of sleeve 368 and then the sleeve is pushed to the left, as previously described causing slot 372 to embrace neck 354 and trap the fixed hood member.

The second embodiment structure is intended for use without a handle grip, such as grip 15 of the first embodiment, and vibrations in the length of the blank will be directly transmitted to the user's hand. Further, this embodiment provides a reel seat structure directly on the outside of the blank so that line and reel vibrations are directly transmitted to the user. The structure having only apertures 326 and 352 in the blank does not unduly weaken the blank.

While preferred embodiments have been shown and described, it will be understood that the present invention is not limited thereto, but may be otherwise embodied within the scope of the following claims.

What is claimed is:

1. In a fishing rod having a handle portion and a reel seat structure
the reel seat structure including a tubular body means, a stationary hood member, a movable hood member, and adjustment means connected with the movable hood member for adjusting the position of same lengthwise along the body toward and away from the stationary hood member for releasably clamping a fishing reel therebetween, the improvement comprising a mounting arrangement for the movable hood member including an elongate keyhold-shaped aperture on the tubular body means having an elongate slot portion and an enlarged head portion at one end of the slot portion, a stem and an enlarged head depending from the movable hood member, the stem and head being inserted through the head portion of the aperture for sliding of the stem in the slot portion during adjusting movements of the movable hood member with the head trapped thereunder, the adjustment means being connected to the head within the tubular body means.

2. The improvement as defined in claim 1, wherein the tubular body means includes a tubular insert body within a fishing rod body, the keyhold-shaped aperture being formed in the insert body, the fishing rod body having an opening exposing the keyhole-shaped aperture, the adjustment means comprising a threaded rod extending from said head and a thumbwheel on a threaded end of the rod, the thumbwheel being received in further aligned apertures formed respectively in the insert body and fishing rod body.

3. The improvement as defined in claim 2 wherein the stationary hood member comprises a part of the fishing rod body defining one end of said opening.

4. The improvement as defined in claim 2 wherein the fishing rod includes a trigger member with a stem and enlarged head fitted through another aperture in the fishing rod body opposite the apertures aforesaid, the trigger member being wedged in place by a slot in the insert body which embraces the stem on the trigger member and traps the enlarged head.

5. The improvement as defined in claim 1 wherein the tubular body means in which said keyhole-shaped aperture is formed comprises a part of a tubular fishing rod blank integral with the handle portion, wherein the adjustment means comprises a threaded rod extending through the interior of the rod from a handle end of the fishing rod, an adjustment knob on the threaded rod at the handle end of the fishing rod for rotating the threaded rod and wherein the threaded rod is engaged in a threaded aperture provided in the enlarged head of the movable hood member whereby rotation of the threaded rod provides adjusting movements of the movable hood member along the slot portion.

6. The improvement as defined in claim 5 wherein the stationary hood member includes a further stem and enlarged head fitted through a further aperture in said part of the fishing rod blank, the fishing rod further including a tubular insert body within the rod blank, the insert body having a slot embracing said further stem and trapping said further head within the interior of the tubular insert body so as to wedge the stationary hood member in place on the fishing rod.

7. In a fishing rod handle structure including a hollow tubular handle member and an element projecting from the handle member, attachment means for said element comprising a tubular insert body received in the handle member, a neck portion on said element, an enlarged head portion on the neck portion, an aperture in the handle member through which the element extends and a slot in the insert member aligned with said aperture, the slot embracing the neck portion of said element with the head portion thereof being wider than the slot and being received within the insert body whereby the element is wedged in place on the handle member.

8. The structure as defined in claim 7 wherein said slot in the insert member forms part of a keyhole-shaped aperture having an enlarged head portion at one end of the slot.

9. The structure as defined in claim 7 wherein said element is a trigger member.

10. The structure as defined in claim 7 wherein said element is a stationary hood for use in clamping a fishing reel.

* * * * *